United States Patent [19]

Reesen

[11] 4,006,395
[45] Feb. 1, 1977

[54] APPARATUS FOR THE CONTROL OF PHOTOSENSITIVE MATERIAL HANDLING AND CUTTING OPERATIONS IN COMPUTER OUTPUT MICROFILMERS

[75] Inventor: Jorgen Reesen, Pittsford, N.Y.

[73] Assignee: Eastman Kodak Company, Rochester, N.Y.

[22] Filed: Oct. 31, 1974

[21] Appl. No.: 519,458

[52] U.S. Cl. .............................. 318/685; 318/39; 318/625; 318/640; 365/64
[51] Int. Cl.[2] .................. G05B 19/40; G03B 27/32
[58] Field of Search .......... 318/685, 696, 601, 602, 318/37–39, 85, 640, 7, 625

[56] References Cited
UNITED STATES PATENTS

| | | | |
|---|---|---|---|
| 3,244,863 | 4/1966 | Paterson | 318/601 |
| 3,572,925 | 3/1971 | Abces et al. | 235/151.1 |
| 3,586,953 | 6/1971 | Markkanen et al. | 318/685 |
| 3,931,639 | 1/1976 | Arter et al. | 318/685 |

*Primary Examiner*—Robert K. Schaefer
*Assistant Examiner*—John W. Redman
*Attorney, Agent, or Firm*—R. L. Owens

[57] ABSTRACT

Apparatus is disclosed for transporting and cutting film in a computer output microfilmer which includes mechanisms for transporting and cutting the film respectively, and circuitry responsive to successive sequences of pulses for controlling such mechanisms. The transport mechanism includes a pair of stepping motors having phase windings responsive to current pulses which drive the film in mutually perpendicular directions respectively. Motor control circuits responsive to the pulses are operative to switch current through these phase windings so that successive columns, each containing a plurality of frames in which images may be recorded, are disposed successively at a film gate. The shaft of the motor which transports the film in the columnar direction has an optical sensor which produces output signals corresponding to the location of the film at a reference position. These output signals are applied to the source which provides the control pulses and may be used to provide synchronism between the control pulses and the position of the film. The cutter is triggered to operate by control pulses which cause a capacitor to be discharged through a cutter operating solenoid. A timing circuit responsive to the voltage across the capacitor inhibits the recharging of the capacitor to avoid unwanted cutter energization. The transport mechanism then moves the exposed and cut film to a processor.

13 Claims, 4 Drawing Figures

APPARATUS FOR THE CONTROL OF PHOTOSENSITIVE MATERIAL HANDLING AND CUTTING OPERATIONS IN COMPUTER OUTPUT MICROFILMERS

CROSS REFERENCE TO RELATED APPLICATIONS

Reference is hereby made to commonly assigned co-pending U.S. patent application Ser. No. 479,382 entitled Distortion Correction Apparatus for Electrooptical Reflectors Which Scans Beams to Produce Images, filed 6/14/74 in the name of R. V. Reinke et al and to the co-pending United States patent application which are referenced therein all of which are assigned to the same assignee as the present application; one of these referenced applications being application Ser. No. 132,955, entitled ACOUSTOOPTIC SCANNER APPARATUS AND METHODS, filed Apr. 12, 1971 in the name of R. A. Spaulding.

BACKGROUND OF THE INVENTION

1. Field of the Invention

The present invention relates to apparatus for the positioning of a photosensitive material to present successive image areas to receive light images and also for other operations, and particularly to electronic circuit controlled apparatus for transporting photosensitive material in discrete steps and in mutually perpendicular directions so as to locate successive image areas for recording of images therein, in frame-by-frame sequence along the columns (or across the width of the photosensitive material before cutting).

The invention is especially suitable for use in computer output microfilmers (COM) for the control of film handling and cutting operations therein. The invention is generally applicable for use in film handling apparatus for moving the film with a high degree of accuracy.

2. Description of the Prior Art

In prior computer output microfilmers, means are provided for recording complete pages in small regions of a film. Each region may be considered to be a frame. The frames are so small that a large number of frames may be recorded across the width of a film. A length of film having such frames in an X-Y pattern of rows extending lengthwise of the film and columns extending across the film is called fiche or microfiche.

In order that the requisite pattern of frames and length of the fiche be obtained it is necessary to transport the film with a high degree of accuracy. Each frame must be located precisely in a film gate where it can be scanned by the image producing apparatus such as described in the above referenced Spaulding application. Inasmuch as any film transport mechanism presents a load having inertia, it is oftentimes difficult to obtain accurate film positioning.

Stepping motors have often been used when accurate and repeatable positioning of a load is desired (see for example U.S. Pat. Nos. 2,686,282; 3,444,447; 3,463,985; 3,523,230; 3,582,752; and 3,671,826). Such motors alone do not afford sufficient control to accurately move film in mutually perpendicular directions for the recording of frames of graphical information in columns across the film and in rows along the length of the film. The transient responses to the passage of current pulses through the windings of such stepping motors may cause dynamic positioning errors due to inertial effect of the transport mechanism resulting in misregistration of the frames in the film gate. It is conventional, as shown in the above-referenced patents and particularly U.S. Pat. No. 3,523,230, to apply pulses to switch current through the windings of stepping motors so as to make the motor step programmed distances in programmed directions. Nevertheless, the dynamic errors may cause a motor to be out of synchronism with the pulses and be displaced from the position corresponding to the pulse sequence. Halting the pulse sequence when the load reaches a reference point maintains the error between the actual load position and the position corresponding to the pulse sequence which has brought the load to the reference position.

Upon completion of the exposure of a certain length of film, it is sometimes desirable to cut the film thereby forming fiche which are then processed. It has been suggested that a solenoid actuated cutting mechanism be used for cutting various webs upon command; the command signal causing the discharge of a capacitor through a solenoid operating winding for energizing the solenoid and bringing the mechanism to cutting position (see U.S. Pat. No. 3,684,373).

SUMMARY OF THE INVENTION

The present invention provides improved apparatus for positioning photosensitive material such as in the form of webs or film and for cutting such material. Successive image areas of the photosensitive material are accurately positioned frame by frame, as in columns and rows to receive the light images.

The improved apparatus provided by the invention also affords electromechanical control of film handling and cutting operations by means of which film may be automatically transported in mutually perpendicular directions so as to present successive frames arranged in a X-Y pattern of columns and rows on the film for exposure so as to record graphic information in each frame. In this improved apparatus improved circuits control stepping motors to position film for microfilming accurately, by means of which a large number of frames may be exposed per unit length of film in a manner suitable for processing into fiche. The improved circuitry can operate the stepping motors both rapidly and in steps having high resolution.

The improved apparatus is especially adapted to control film handling and cutting mechanism in a computer output microfilmer, and is compatible with computers or other programmer devices.

More specifically the improved apparatus for controlling the operation of stepping motors which is provided by the invention adapts the motors to locate a load, particularly a film, to position successive areas thereof in the exposure aperture of a computer output microfilmer. The apparatus is capable of accurately positioning the load in spite of inertial forces developed in the mechanism which positions the load, such as a carriage mechanism which handles the film or in the motors themselves.

In addition, the improved apparatus according to the invention is adapted to control a film cutter and prevents erratic or unwanted operations thereof such as may cause the film to be ruined by being cut in an improper location.

Briefly described, apparatus for controlling the handling of film in a computer output microfilmer which is provided in accordance with the invention, is adapted to move the film laterally in a direction across the width of the film, referred to hereinafter as the Y direction, and then longitudinally in a direction lengthwise of the film, hereinafter called the X direction. The X and Y directions are mutually perpendicular to each other. The film is fed into a mechanism, such as a carriage which can engage the edges of the film for moving it in the Y direction. The mechanism also includes means such as rollers engageable with the film for transporting it in the X direction. As the film is transported in the Y direction, successive frames in a column of frames are positioned as at an exposure aperture of the computer output microfilmer, where each frame is adapted to be scanned for recording images, such as graphic information therein. Graphic information is intended to include alpha-numeric data and other symbols. After a column of frames is recorded, the film is transported by the mechanism in the X direction so as to present another column of frames at the aperture for recording. Simultaneously the Y direction may be retraced to the top of the column. A first stepping motor is provided for driving the film in the Y direction and the second stepping motor is provided for driving the film in the X direction. There is also provided a means such as a programmer and multiplexer which produces sequences of pulses. Each of the stepping motors has its own motor control means, which is responsive to a different multiplexed sequence of pulses and controls the passage of current for the energization of the stepping motor windings. To the shaft of the motor which drives the film in the Y direction there is attached, for rotation therewith, a sensor which provides output corresponding to the location of the film at a reference location say at the middle of a column. These outputs are applied to the means which produces the sequence of pulses so as to synchronize or produce correspondence between the position of the film and the pulse sequences notwithstanding dynamic errors in the film transporting mechanism including its carriage and stepping motors. As each frame arrives and is located in the exposure aperture it is maintained in position there during exposure operations by an electromechanically operated plate, called a stomper, for maintaining the film located for proper focus in the aperture. After a length of film is exposed an electromechanical cutter may be actuated in response to certain pulses in the sequences of pulses as by triggering the discharge of a capacitor which provides energizing current for the cutter actuator. The voltage across the capacitor is desirably sensed and applied to a timing circuit which delays the recharging of the capacitor so as to avoid unwanted film cutter energization.

The foregoing and other objects and advantages of the present invention will become more apparent from a reading of the following description of the preferred embodiment of the invention which is set forth hereinafter and is shown in the accompanying drawings.

DESCRIPTION OF THE PREFERRED EMBODIMENT

Figure 1:
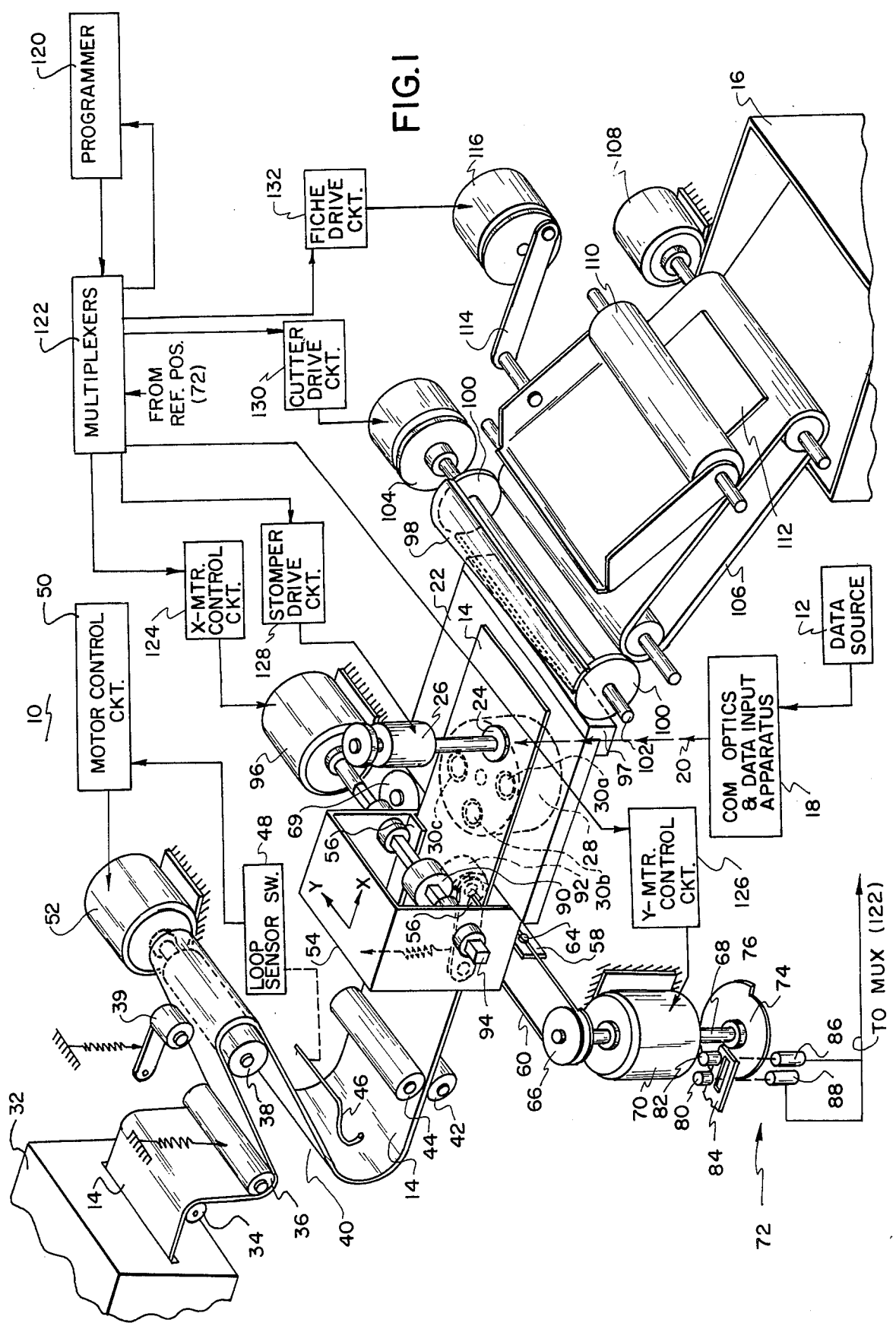
FIG. 1 is a simplified diagrammatic view of a computer output microfilmer which embodies the invention.

Referring now to FIG. 1 there is shown in simplified form a computer output microfilmer (COM) 10 (particularly in the film transport and control apparatus thereof), which microfilmer produces microfilm records of information from a data source 12 on a photographic recording medium provided by a film 14. The COM 10 may be operated on line, in which case the data source 12 may be a computer, such as an IBM 360/370 system which is equipped with interface circuitry for coupling the computer to the COM. Reference may be had to the following United States patents for further information respecting suitable interface circuitry: 3,303,476; 3,336,582; and 3,337,619. The COM may also be operated off line in which case the data source 10 may be a magnetic tape station which provides data to the COM through a suitable interface. The film 14 may suitably be a photothermographic material which is sensitive to laser light and which may be processed on a drum type conductive heat type processor 16, say for example at temperatures in the range from about 80° C to 170° C for processing time from about two seconds to about 15 seconds. A representative drum-type processor is disclosed in U.S. Pat. No. 3,709,472. Exemplary photohermographic materials which may be used in the film 14 are described in the following United States Pat. Nos. 3,506,444 3,457,075; and 3,672,904.

The information from the data source is applied to COM optics and data input apparatus 18 which are described in detail in the above referenced co-pending applications. Briefly data are converted into light beams 20 which are scanned by nutating galvanometers to write lines of characters on a frame of the film 14 which is located in a film gate provided by an aperture in a film support plate 22 against which the film is held or maintained by a pressure plate 24 which is reciprocally movable up and down by a stomper or film gate solenoid 26. The optics of the COM may be located in a turret 28 whose top surface coincides with the top surface of plate 22 on which the film is guided.

The film 14 may suitably be 105 mm film when microfiche records are desired. Alternatively the film 14 may be 16 mm film. The cartridges may include switches which control logic circuits, which correspond to the 16 mm and 105 mm cartridges. The data on tape also indicates whether use of 16 mm or 105 mm film is required. If the data and switch control is inconsistent, the COM will not operate. The apparatus as illustrated is implemented for handling 105 mm film and cutting such film to form microfiche. The film may be contained in a cartridge located in a film supply nest 32. The film 14 is passed over an idler roller and under a spring biased dancer roller 36. From the dancer roller, the film is fed between a drive roller 38 and a resiliently urged pressure roller 39. The section of the film around the dancer roller and between the idler roller 34 and drive roller 38 varies in size as the film is fed by the drive roller so as to reduce the effects of supply roll inertia and maintain the film under a relatively constant tension as it is fed by the drive roller 38. The drive roller 38 and the pressure roller 39 may be provided with one way clutches so as to prevent film backup.

A loop of the film 40 which is of "S" shape is formed between the drive roller 38 and a pair of guide members, such as edge guides or the depicted rollers 42 and 44. 42 and 44 are spaced apart by a distance somewhat greater than the thickness of the film 14 so as to provide sufficient clearance for the film to move laterally (i.e. in the Y direction) as it exits from the loop 40. The loop 40 is also maintained to be of sufficient size so as to permit lateral movement. A wire formed sensing arm 46 senses the size of the loop and operates a loop sensor switch 48 to provide an error signal to a motor control circuit 50 which is described more fully, hereinafter in connection with FIG. 4. A film in-feed motor 52 is operated by the motor control circuit 50, in accordance with the size of the loop as sensed by the arm 46. When the loop size is reduced the loop sensor switch 48 closes and actuates the motor control circuits which energizes the motor 52. When the loop reaches desired size as determined by the position of the arm 46, the motor stops. Preferably, and realizing that the motor 52 will be intermittently energized, the speed of rotation of the motor 52 and the diameter of the drive roller 38 are selected to drive the film in the longitudinal or X direction at a rate somewhat faster than the film may be driven in the X direction as it is located in the film gate provided in the plate 22.

At the film gate, the film is transported in the X and Y direction to locate successive frames in the gate for recording by the optics and data input apparatus 18. This film transport mechanism includes a carriage 54 having guide rails 56 which engage the edges of the film. A bracket 58 extends downwardly from the carriage 54. An endless belt or cable 60 is attached to the bracket as by a rivet 64 and is entrained around pulleys 66 and 69, respectively. The pulley 66 is connected to the shaft 68 of a stepping motor 70. The stepping motor 70 rotates the pulley 66 to drive the carriage 54 in the Y direction. Accordingly, the motor 70 is referred to as the Y-motor. Attached to the shaft 68 is an optoelectric reference position sensor arrangement 72, which will be described in greater detail in connection with FIG. 3. Briefly it includes an encoding disc 74 having two tracks. One of these tracks is a reference track and contains an opening 76 at a certain position corresponding to the lateral position of the film when the carriage is located in its mid point which is the desired position for film advance for the cutting operation. The other track is provided by a circular opening in the form of a slot 78 extending 180° around the periphery of the disc 74. The end of the slot 78 is centered at the reference position (i.e. along a radial line which extends to the center of the opening 76). The slot 78 thus provides a single step function track with a step transition exactly corresponding to the reference position and is useful in determining in which direction the Y motor shaft 68 must rotate in order to bring the carriage to the reference position. Each of the tracks is illuminated by a separate light source 80 and 82, respectively. These sources 80 and 82 may be provided by light emitting diodes. A light is projected through an aperature plate 84 which is narrower in width than the opening 76. A pair of photodetectors 86 and 88 are respectively responsive to light from the sources 82 and 80 and provide outputs which indicate that the shaft 68 is nearing the reference position and the direction the shaft must rotate to reach the reference position, respectively.

The film is driven to the film gate in the X direction by a metering roller 90 against which the film is engaged by a spring biased pressure roller 92. The metering roller 90 is driven by the shaft 94 of a stepping motor 96. The motor 96 herein after is called the X motor. The X motor 96, its shaft 94, the metering roller 90 and the pressure roller 92 may all be mounted on the carriage 54 to provide a unitary structure which is movable with the carriage 54 in the Y direction. Alternatively rollers 90 and 92 may be mounted on a square shaft by bushings which permit axial movement of the rollers 90 and 92 with the film 14 in the Y direction.

The X and Y motors operate so that the film carriage 54 moves in the Y direction to locate successive frames down a column, as such frames are located in the film gate between the turret 28 and stomper 24. After each exposure, the stomper 24 is lifted by the stomper solenoid 26 and the film is moved in the Y direction to locate the next successive frame in the column in the film gate. After a column of frames is exposed the X motor advances the film to the next column and the Y motor is operated at the same time so as to retrace or move the film to the end or top of the next column. The reference position, which is located midway in the Y retrace, is then sensed by the reference position sensor 72. The Y position is electronically referenced and establishes precise and accurate positional correspondence between the position of the carriage (the film position), the angular position of the shaft 68 and the sequence of pulses which cause the Y motor 70 to step and locate successive frames of the column in the film gate. The position of the X motor shaft may be similarly referenced when the film is cut to length.

A film cutter includes a fixed blade 97 which is mounted along the rear edge of the plate 22 and a rotatable blade 98 which is driven by a rotary cutter solenoid 104, as by being mounted on a shaft 102 by means of discs 100 or other suitable drive means from the solenoid 104. When the cutter solenoid is energized, the shaft 102 rotates in a counter clockwise direction and causes the blade 98 to slice the film at the fixed blade 97 in the manner in which a scissor would cut the film. The cut film-see portion 112 which has been exposed and contains the pattern of frames-drops onto a belt 106 continuously driven by a motor 108. A pivotally mounted nip roller 110 is pressed against the cut film length 112, when pivoted downwardly towards the belt 106 by a crank arm 114 attached to a rotary solenoid 116. The exposed side of the film rests against the belt 106 to avoid any marring thereof. The cut film portions 112, which typically are microfiche, are positively fed into the processor 16 to be processed.

A programmer 120 which may be a small computer known in the art as a mini-computer and multiplexers 122 provide control signals such as pulses in proper sequence for controlling the operation of the motors 70 and 96 and of the solenoids 26, 104 and 116 as discussed above. The multiplexers 122 are distributors which route these pulses to the motor control and drive circuits for these motors and solenoids. Pulses are then routed by the multiplexers 122 to an X motor control circuit 124 which controls the energization of the X motor, to a Y motor control circuit 126 which similarly controls the energization of the Y motor 70, and to drive circuits 128, 130 and 132 for the stomper solenoid 26, the cutter solenoid 104 and the nip solenoid 116, respectively.

The programmer 120 may be of conventional design and may include counters for generating the pulses in desired timed sequence. Since such programmers for generating pulses which control stepping motors are known in the art, (see for example U.S. Pat. No. 3,523,230 referenced above) they are not described in detail herein. In the event the programmer 120 is a mini-computer it may be programmed in accordance with conventional programming techniques and to provide the desired sequences of pulses (see for example the Small Computer Handbook, published by Digital Equipment Corporation, 1967 and/or the Varian 620/L Computer Handbook, published by Varian Data Machines, 1971). The multiplexers 122 receive the outputs from the reference position sensor and apply such outputs to the programmer for resetting (e.g. re-zeroing) the counters so as to synchronize the pulse sequences in correspondence with the actual location of the film.

Figure 2:
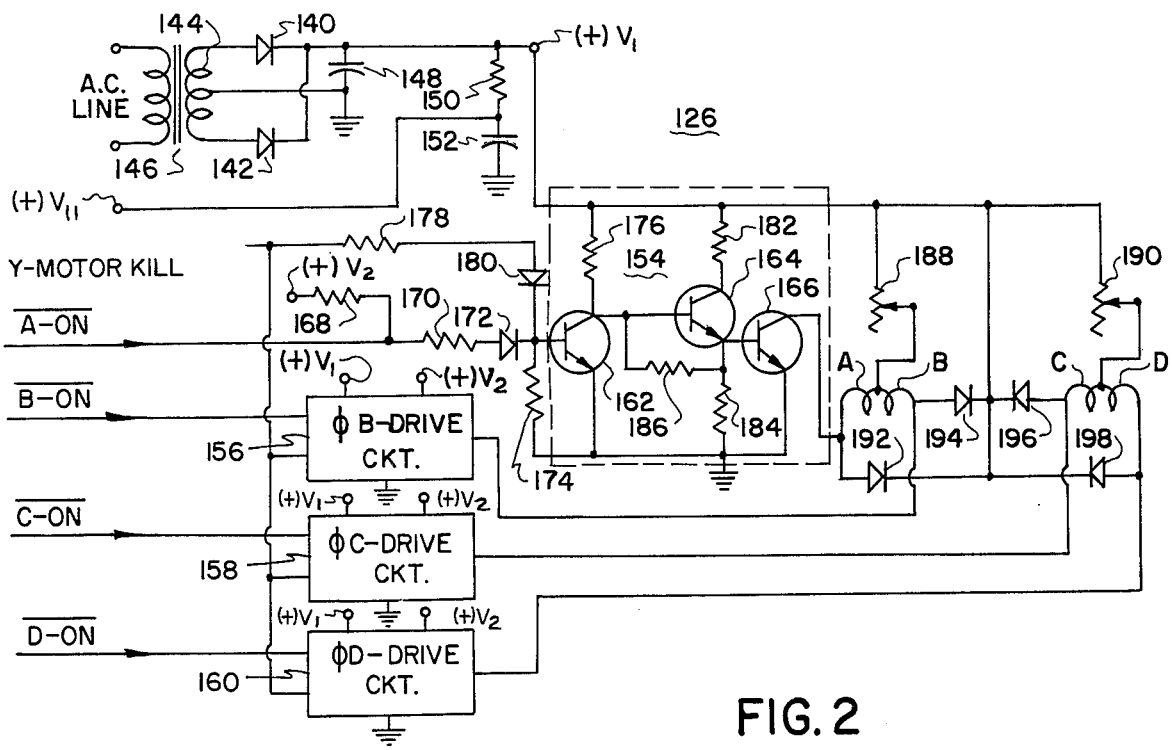
FIG. 2 is a diagram partly in block and partly in schematic form which illustrates the operating windings of a typical motor shown in FIG. 1 and the motor control circuit therefor.

Referring to FIG. 2 there is shown the motor control circuit 126 for the Y motor 70. In FIG. 2 the Y motor 70 is shown as four phase windings A, B, C and D. The motor control circuit 124 for the X motor 96 is similar to the motor control circuit for the Y motor which is illustrated in FIG. 2 and therefore will not be described in detail herein. Operating voltage is provided from the alternating current A.C. line source through a full wave rectifier consisting of a pair of diodes 140 and 142 connected across the center tab secondary winding 144 of a power transformer 146. The output voltage indicated as $+V_1$ is available across a filter capacitor 148. A drive circuit includes a resistor 150 and a capacitor 152 to provide voltage indicated at $V_{11}$ which is applied to light emitting diodes 80 and 82 which are connected in series to ground, and provide the light sources for the reference position sensor 72 (see FIG. 3). Each of the motor phase windings A, B, C, and D have an identical drive circuit, the drive circuit 154 for the $\phi A$ winding is shown in detail. The other drive circuits 156, 158 and 160 for the $\phi B$, $\phi C$ and $\phi D$ windings are identical and therefore are not shown in detail. The logic levels used are preferably transistor logic (TTL) compatible. The active signal level is 0 volt or a low level TTL signal.

It is desirable that the stepping motor be driven in small angular steps such as 0.9° per step to obtain high resolution. To this end the preferred phase winding energization sequence is as follows: A, A and B, B, B and C, C, C and D, D, D and A, A,. . . . The phase drivers receive a sequence of signals on the "$\overline{\text{A-ON}}$" "$\overline{\text{B-ON}}$" "$\overline{\text{C-ON}}$" and "$\overline{\text{D-ON}}$" line to provide the desired phase winding energization sequence. In the event that travel of the carriage in the reverse direction is desired, the phase energization sequence is reversed by reversing the sequence of signals set forth above.

The phase drive 154 consists of three N-P-N transistor 162, 164 and 166. The base of input transistor 162 is connected to a biasing circuit consisting of a pull up resistor 168 connected at one end to a source of positive voltage indicated as $+V_2$ which may, in the event that TTL compatible signals are desired, be 5 volts. Another resistor 170 connects the resistor 168 to the base electrode of the transistor 162 via voltage protection diode 172. A return path is provided by another resistor 174 connected from the base of the transistor 162 to the point of reference potential (ground). Operating voltage $+V_1$ is applied via a collector resistor 176. Also connected to the base, by way of a resistor 178 and a line protection diode 180, is a "Y Motor Kill" input which places a positive voltage on the base of the transistor 162 to maintain it saturated at all times. This will prevent energization of the phase winding insuring that the switching transistor 166 remains non-conductive or off so long as the Y motor kill voltage is applied to the base of the transistor 162.

The transistor 164 has its base connected to the collector of the input stage 162 and is emitter coupled to the switching transistor 166. The collector of the transistor 164 is connected by way of a resistor 182 to the supply $+V_1$. This resistor 182 may be shared in common by the corresponding stage of the $\phi C$ drive circuit in order to save parts, if desired. The $\phi B$ and $\phi D$ drive circuits may also share their second stage collector resistor. This is because either $\phi A$ nor $\phi C$ are energized simultaneously, nor are $\phi B$ or $\phi D$. Resistors 184 and 186 are provided between base and emitter of transistors 166 and 164 respectively to ensure complete cut-off.

The collector to emitter path of the switching transistor 166 is connected in series with the $\phi A$ winding and a series resistor 188 to the operating voltage supply at $+V_1$. This series resistor 188 is connected to one end of the $\phi A$ winding and also to one end of the $\phi B$ winding and is shared by these windings since $\phi A$ and $\phi B$ are not energized simultaneously as explained above. Another series resistor 190 is similarly connected between one end of the $\phi C$ and $\phi D$ windings and the operating voltage source at $+V_1$ is shared by the phase windings C and D. The series resistors 188 and 190 limit the current in the phase windings to a permissible value say 4 amperes for a 24 volt supply in the case of the Y motor and 2.5 amperes in the case of the X motor. The series resistor also serves to reduce the time constant which controls the rise of current with respect to time in the phase winding by a factor equal to the sum of the series resistance and the motor phase winding resistance divided by the motor phase resistance (i.e. the time constant L/R where L is the inductance of the phase winding is reduced by virtue of this series resistor). Accordingly the motors may be driven rapidly if desired. Diodes 192, 194, 196 and 198 are connected across the series combination of each phase winding and the series resistor connected thereto. The diode 192 is for example connected across the $\phi A$ winding and the series resistor 188. The diodes are polarized oppositely to the polarity of the supply at $+V_1$. However these diodes pass current due to the flyback or kickback voltage generated in the phase windings, when current therethrough is switched off by the switching transistor 166, and thus permit rapid collapse of magnetization when the current is so switched off. The diodes are therefore useful to prevent any damage to the phase windings or their transistor drivers due to such flyback voltages.

When the $\phi A$ windings is to be energized, the $\overline{\text{A-ON}}$ input is brought to a zero level thus reducing the voltage at the base of the transistor 162 to a point where that transistor is rendered non-conductive and turned off. The second transistor 164 then becomes conductive and in turn provides base current for switching transistor 166 through resistor 182, thereby turning switching transistor 166 on to its full conducting state. Current flows in response to the potential from the supply at $+V_1$, through the series resistor 188 the $\phi A$ winding and the collector to emitter path of the switching transistor 166 to ground. For a Y motor drive in the forward direction, the $\overline{\text{OA-ON}}$ line is activated by being brought to a zero level, and remains thus activated while the $\overline{\phi B\text{-ON}}$ line is activated similarly; thus energizing the φA and the φB windings simultaneously. The $\overline{\text{A-ON}}$ line activation is then terminated while the $\overline{\text{B-ON}}$ activation continues, so as to obtain another 0.9° of rotation from the Y motor 70. The sequence of activation then continues with successive phases singly and in pairs until a proper frame is located in the film gate. The stomper solenoid 26 then is actuated by a signal indicated as the "Stomper Down" signal which is applied to the stomper drive circuit 128. This circuit will be described more fully hereinafter in connection with FIG. 4. The frame is then recorded. The stomper solenoid control pulse is then terminated and the stomper solenoid retracts thus lifting the plate 24 (See FIG. 1). The Y motor is then actuated again until the next frame in the column is located in the gate. The stomper solenoid then descends and maintains the film in the gate while the next frame is recorded. After the last frame in the column is recorded, the X motor operating signals are applied from the multiplexer 122 to the X motor control circuit 124 and the motor is operated to advance the film 14 one row step. The Y motor at the same time causes a retrace operation. At the middle of the retrace operation when the reference position is reached output is provided from the photodetector 86 in the reference position sensor arrangements 72; the programmer 122 or computer responds to this output and suitably re-programs the counters, and the retrace proceeds to the first frame position at the top of the column.

Figure 3:
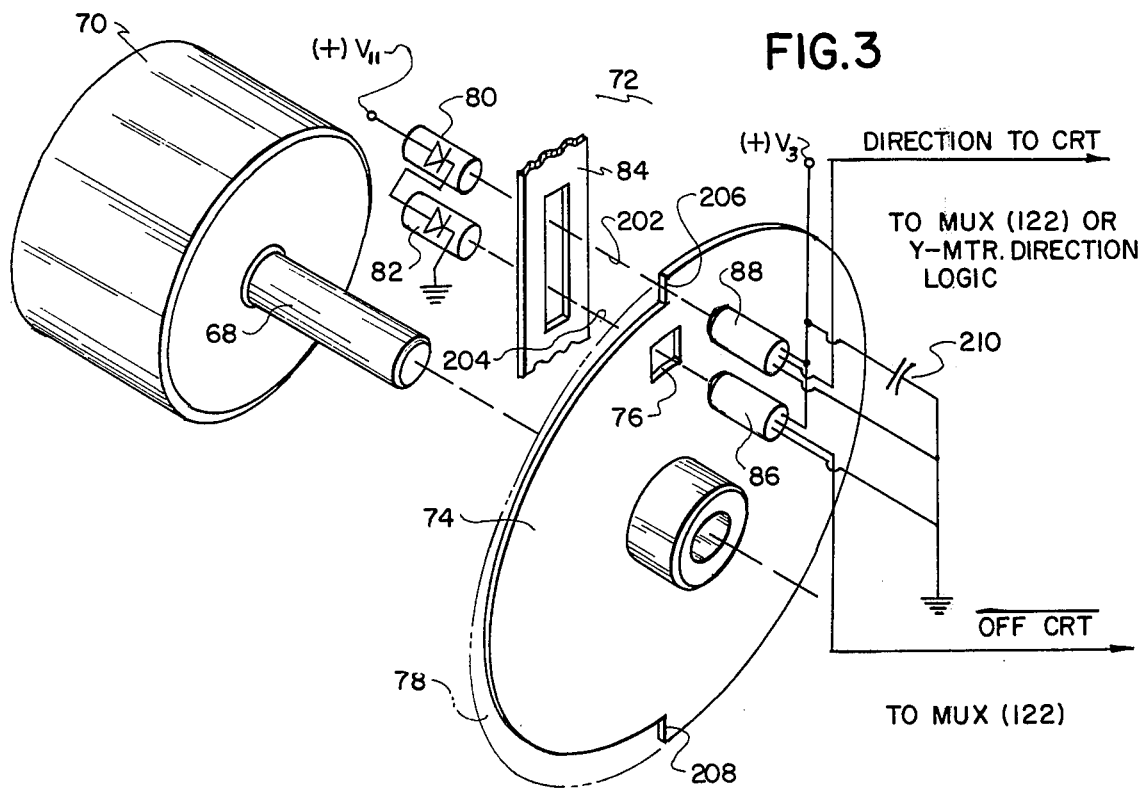
FIG. 3 is an exploded perspective view of the reference position sensor which is illustrated in FIG. 1.

The reference position sensor is shown in greater detail in FIG. 3. The aperture in the aperture plate 84 is suitably 1 and ½ motor steps wide and passes beams 202 and 204 from the light sources 80 and 82 through both the reference track, at which the reference aperture or opening 76 is located, and the direction track at which the 180° peripheral slot 78 is located. The ends 206 and 208 of the slot 78 are located along a diameter of th disc 74 which passes through the center of the opening 76. The opening 76 itself is suitably somewhat wider than the aperture in the plate 84, about six motor steps being a suitable width. The center of the opening 76 (viz, where it is intersected by the diameter which extends between the slot ends 206 and 208) corresponds to the reference position. The total shaft 68 rotation for full carriage travel (i.e travel in the Y direction the entire width of the film 14) is suitably less than one revolution of the motor shaft 68. The photodetectors 86 and 88 are desirably photocell units which contain a light detector such as phototransistors and amplifiers which are integral therewith and serve to raise the level of the output signal to a level that interfaces with the multiplexer (122, FIG. 1) circuitry. To this end, a source of operating voltage indicated at $+V_3$ is applied to the photocell units across a decoupling capacitor 210. The amplifiers in the units 86 and 88 are returned to ground potential and provide outputs which are TTL logic levels. The output from the unit 88 indicates the direction to center. When light is incident upon the photocell unit 88, the output from the unit 88 is high, indicating that the motor shaft 68 must rotate in the counter clockwise direction in order to bring the shaft to the reference position. Similarly, when the photocell unit 86 is illuminated, the output therefrom is high indicating that the shaft is near or at the reference position.

The reference position is preferably the film path centerline. However, merely sensing that the carriage 54 (FIG. 1) is at the reference position is insufficient to avoid the introduction of positioning errors. Due to the inertia of the carriage 54 and the parts movable therewith (i.e. the entire motor drive carriage system) the Y motor 70 will at times lag or lead its intended position, by which is meant the position corresponding to the motor phase winding energization condition which is applied thereto. If the motor phase winding energization sequence was terminated when the carriage 54 reached the reference position the motor shaft could eventually settle at a point several steps away, either leading or lagging the motor phase winding energization sequence. The sensing arrangement 72 which is mounted on a motor shaft 68 enables proper referencing of the motor carriage system. The aperture plate 84 and the encoding disc 74 together with their associated light sources and detector units 80, 82, 86 and 88 are preferably packaged in close proximity with minimum practical separation so as to permit movement of the disc 74 with respect to the plate 84.

In practice, the motor, the encoding disc and the sensor aperture plate may be aligned by activating the reference position phase drive combination, which may be phase A energized alone, thereupon aligning the encoding disc 74 with its edge 206 exactly in the center of the aperture in plate 84, and then locking the encoding disc 74 to the motor shaft. Now with an aperture width of 1½ motor steps in plate 84 and an encoding disc opening 76 of a width of 6 motor steps detector 86 will provide an output signal for shaft position at or near exact reference position within a minimum shaft deviation of 2½ motor steps and a maximum shaft deviation of 3¾ motor steps. Within this range of output from detector 86, for a motor controlled by eight different phase energization combinations, that combination used for reference position can occur only once. The range of response for detector 86 will depend on detector sensitivity and level of illumination provided by light source 82.

The motor shaft mechanical position and motor phase electrical energization can get out of exact correlation especially during acceleration or deceleration of the system even if the pulse rate to maintain exact sychronization is not exceeded. This phenomenon will not affect reference point detection as long as the motor position does not lag or lead the electrical phase energization by more than a number of steps corresponding to the range of response of detector 86.

The output of detector 86 is gated with a signal derived from the reference drive phase combination (VIZ. the combination of $\overline{\text{A-ON}}$, $\overline{\text{B-ON}}$, $\overline{\text{C-ON}}$, $\overline{\text{D-ON}}$ signals which exist at the actual reference position). The gated output may then be used to terminate the motor phase winding energization signal sequence at this combination, and the carriage 54 will then come to rest exactly at the reference position, or the gated output may be used during columnar motion of the carriage 54 to initiate the count of steps from the reference position to the top fiche row or any other desired final stopping point for the Y motion of the film carriage without the carriage 54 first coming to a halt in the reference position.

The slot 78 provides a single step function track, with the step transition corresponding to the actual reference position. The photo detector unit 88 output at the reference position by virtue of the location of the step transition of the encoding disc at the center of the aperture in the plate 84 may be ambiguous. Also, the output of photo detector unit 88 may not indicate proper direction for electrical phase sequencing during periods when Y motor shaft position lags or leads electrical phase sequence while motor shaft position is near the reference position. The output from the unit 88 may be memorized at time of start of Y motion toward reference positon and otherwise ignored to circumvent this ambiguity. Accordingly the sensor and gating system indicates that the reference position has been reached. If before start of motion the carriage 54 is not at the reference position, the direction to center output from the unit 88 properly indicates the direction of travel and may be applied by way of the multiplexer 122 to the programmer 120 to reset the counters therein and obtain pulse sequences for energizing the motor phase windings to drive the motor in the proper direction.

Figure 4:
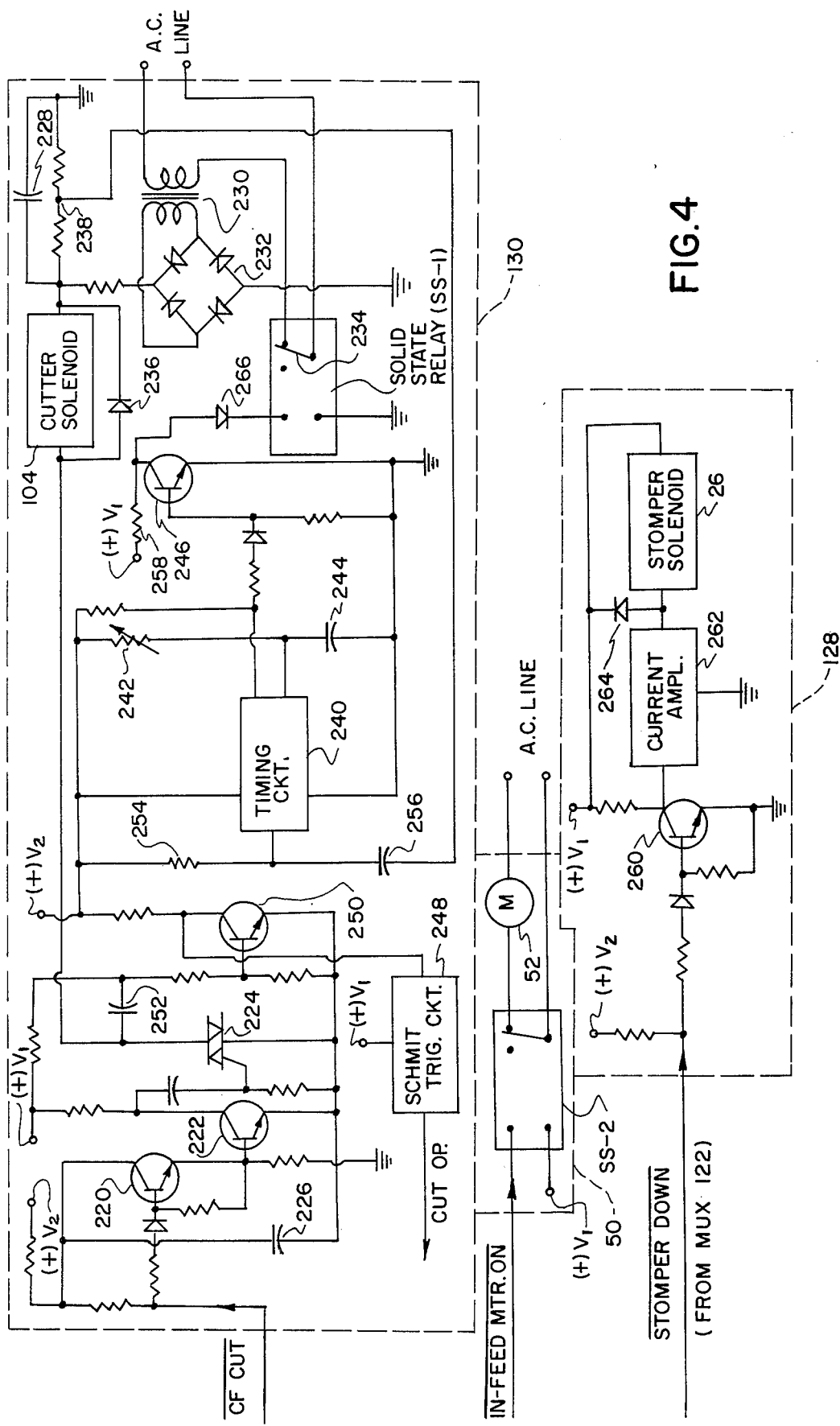
FIG. 4 is a schematic diagram of the cutter drive, the infeed motor control, and stomper or film gate drive circuits shown in FIG. 1.

The film cutting sequence may be initiated under control of the programmer 120. The reference sensing arrangement may be used to center the film in the Y direction. The X motor 96 then is energized to advance the film 14 a programmed distance. A pulse is then applied to the cutter drive circuit. This pulse is indicated in FIG. 4 as the $\overline{CF \text{ cut}}$ command pulse, which stands for "complete fiche cut". This pulse is applied to an input transistor stage 220 which is similar to the stage 162 (FIG. 2) such that the drive circuit 130 will be TTL compatible. A second stage 222 which is similar to the stage 164 has its collector capacitively coupled to a solid state switch shown as a TRIAC 224. It is desirable that the source of voltage indicated as a $+V_2$ be supplied to the input stage 220 across a capacitor 226 of large value, say about 1000 microfarrads to insure that the second stage 222 will remain saturated for a period of time even when the source of operating voltage, indicated at $+V_1$, which may be indicated above as a 24 volt supply, disappears when power is turned off. In this manner, spurious operation of the cutter at power shut down is avoided.

The TRIAC 224 is connected in series with the operating winding of the cutting solenoid 104 and an energy storage capacitor 228. Power for charging the capacitor is obtained from the alternating current line via a power transformer 230 and a bridge rectifier 232. The primary winding of the transformer 230 is connected across the line by way of the switching terminals, diagrammatically illustrated as a switch 234 of a solid state relay (SS-1). Such relays are commercially available and obtainable from the Crydom Division of International Rectifier, Inc., in El Segundo, California, and other suppliers. The operating terminals of relay SS-1 are connected respectively to ground and to the source of voltage $+V_1$ through a resistor 258 and a visible light emitting diode 266 thus holding the contact path terminals 234 normally closed. The visible light emitting diode serves as a service indicator for relay SS-1 and will light when the relay is energized. In this manner capacitor 228 will be charged beforehand, and when the TRIAC 224 is triggered the capacitor 228 discharges through the cutter solenoid operating winding and the TRIAC 224 to ground. The cutter solenoid will then be operated so as to cause the film to be cut. A diode 236 connected across the cutter solenoid short circuits the solenoid to damp flyback voltage.

A voltage divider 238 is connected across the capacitor 228 and is connected to an integrated timing circuit 240 through a differentiating network consisting of capacitor 256 and resistor 254. The timing circuit 240 acts somewhat like a one shot multivibrator and produces an output pulse whenever the voltage across the capacitor 228, as sensed by the divider 238, drops below a certain level. The duration of this pulse is determined by the value of a resistor 242 and a capacitor 244. A suitable timing circuit 240 may be obtained from Signetics of Sunnyvale, California, their part No. 555 being suitable.

The output pulse from the timing circuit drives transistor stage 246 to saturation which in turn de-energizes the SS-1 relay by shorting its operating terminals for the duration of the pulse. During the pulse duration the switch contact 234 opens and allows the capacitor 228 to discharge completely, and for the magnetic field built up during the discharge of the capacitor 228 in the solenoid 104 operating winding to also collapse completely. The TRIAC 224 is therefore positively cut off by removal of its operating voltage and trigger control via transistor stage 222 is resumed. The TRIAC 224 thus will not remain on due to any residual current from capacitor 228 or power transformer 230. After the delay time of the pulse to the SS-1, AC power is again turned on and the capacitor 228 permitted to recharge.

A Schmidt trigger circuit 248 is connected to the collector of a normally conductive transistor 250. The TRIAC 224 is connected to the base of the transistor 250 by way of a coupling capacitor 252. The coupling capacitor 252 momentarily causes conduction in transistor 250 to be cut off when the TRIAC 224 is fired. The Schmidt trigger 248 is thereby activated and produces an output pulse which serves as a cutter circuit operated signal. This signal may be applied to the multiplexer 122 or to motor kill inputs of the X and Y motor control circuits 124 and 126 so as the prevent film motion until the cutter operated signal terminates thus indicating the completion of a film cutting operation. Alternatively the Schmidt trigger 248 might be activated by a switch mechanically coupled to the actual cutter mechanism. After the cutter is operated the film may be retracted by the X motor 96 (FIG. 1) a small amount to permit the film to clear the cutter before advance via X motor operation to the next cut if a sequence of cut operations are required.

The stomper or film gate pressure plate drive circuit 128 is illustrated also in FIG. 4. This drive circuit is similar to the fiche drive circuit 132. The fiche drive solenoid 116 is energized by a multiplexer pulse for several seconds including the duration of the CF CUT pulse. The nip roller 110 is then brought down against the belt 106 and insures that the cut microfiche is fed into the processor 16.

The stomper solenoid 26 is operated by a stomper down pulse from the multiplexer 122 (FIG. 1). This pulse is applied to a transistor stage 260 similar to the stage 220 which provides a TTL logic signal compatible input circuit. The stage 260 has its collector connected to the higher voltage supply $+V_1$. The second stage of the drive circuit 128 is a current amplifier 262 which may be a Darlington dual transistor integrated circuit. Current flows from the $+V_1$ supply through the stomper solenoid operating winding 26 and the current amplifier 262 to ground, when the stomper down pulse causes the input transistor stage 260 to become nonconductive and cut off. A diode 264 is connected across the stomper solenoid operating winding for suppressing flyback voltage. The motor control circuit 50 for the in-feed motor 52 is also shown in FIG. 4. A solid state relay SS-2 similar to the solid state relay SS-1 used in the cutter drive circuit 130 is operated by pulses from a switch controlled by the loop sensor arm 46 (FIG. 1). When the loop shortens, the In-Feed Motor On pulse causes the solid state relay SS-2 to close thus applying alternating current to the in-feed motor 52 which drives film into the loop 40. The switch may be a micro-switch type device, a magnetic reed operated by a moving magnet or a LED source and photodetector combination interrupted by a moving vane.

From the foregoing description it will be apparent that there has been provided improved film handling and cutting apparatus especially suitable for use in computer output microfilmers. While a preferred embodiment of such apparatus has been described in detail to illustrate the invention, it will be appreciated that variations and modifications thereof within the scope of the invention will become apparent to those skilled in the art. Accordingly, the foregoing description should be taken as illustrative and not in a limiting sense.

What is claimed is:

1. For use in a computer output microfilmer which is adapted to record light images of frames in a sequence on successive image areas of a photosensitive material to form columns of recorded frames, the improvement comprising:
   1. means for producing predetermined first and second sequences of control pulses,
   2. a first stepping motor operatively associated with such material and responsive to said first squence of control pulses for moving the material laterally in a first direction across the width thereof to predetermined lateral positions,
   3. a second stepping motor operatively associated with the material and responsive to said second sequences of control pulses for moving the material in a second direction perpendicular to said first direction to predetermined positions along said second direction, whereby successive image areas of the material are located by said first and second motors for the recording of a light image of frames in a column,
   4. means responsive to particular pulses from said sequence producing means for maintaining located image areas in position during the recording of light images of frames,
   5. means coupled to said first motor for providing output signals which correspond to the location of image areas of the material along said first direction and applying said output signals to said sequence producing means which in response thereto provides a selected one of said first sequence of control pulses, and
   6. means defining a loop path for the material spaced from said first and second motors to facilitate movement of material in said first and second directions by said first and second motors, respectively including:
      i. feeding means operatively associated with the material and adapted when actuated for feeding material into said loop path, and
      ii. loop sensing means for sensing the size of the loop of material in said loop path and for controlling the actuation and de-actuation of said feeding means to control the size of the loop of material.

2. The invention as set forth in claim 1 wherein said apparatus further comprises means also responsive to pulses from the sequence producing means for cutting said material after a plurality of said columns of frames are recorded to provide lengths of said material after recording.

3. The invention as set forth in claim 2 including at least one endless belt disposed forward of said cutting means in said second direction of movement of said material for receiving on a portion thereof the cut lengths of the material on means for driving said belt so that said receiving portion travels in said second direction, a roller pivotably mounted over said receiving portion, and means operated by the same pulses as operate said cutting means for pivoting said roller towards said belt to provide driving engagement of said cut lengths of material with said receiving portion of said belt.

4. The invention as set forth in claim 1 wherein said first and second motors have two pairs of phase windings, and said motor control means includes means for applying energizing voltage separately to said pairs of windings of said first and second motors, respectively, and means operated by said pulses for selectively closing current paths through only one of said windings in both of said pairs simultaneously to drive said motors.

5. The invention as set forth in claim 4 wherein said selective current path along means includes a separate switching transistor connected between the other ends of each of said phase windings and a point of reference potential, and means for maintaining said switching transistor non-conductive except upon occurrence of certain of said pulses which correspond thereto.

6. The invention as set forth in claim 5 wherein said maintaining means comprises an input transistor, a second transistor, baising means responsive to said certain pulse for maintaining said input transistor conductive, said second transistor having a base to emitter path connected across the collector to emitter path of said input transistor and being baised to be non-conductive when said input transistor is conductive, a resistor connected from the emitter of said second transistor to the point of reference potential, and the emitter of said second transistor also being connected to the base of said switching transistor.

7. The invention as set forth in claim 6 including means connected in the biasing circuit of each of said input transistors for applying voltage to the bases thereof of amplitude sufficient to maintain said input transistors conductive whereby to maintain said switching transistors nonconductive and stop said motors.

8. The invention as set forth in claim 7 including means responsive to said sensing means output for operating said voltage applying means to said first motor.

9. The invention as set forth in claim 1 including a carriage through which the material travels, said first stepping motor having a shaft coupled to said carriage for moving said carriage in said first direction when said first motor is energized, and means coupled to said first motor shaft including electrooptical sensing means for providing first and second outputs respectively indicating when said first motor shaft is at a reference position and the direction in which said first motor shaft must rotate to reach said reference position.

10. The invention as set forth in claim 9 wherein said sensing means comprises a disc rotatable by said first motor shaft, a pair of photodetectors disposed on one side of said disc spaced along said disc from each other and disposed at an angular position corresponding to said reference position, said disc having an opening radially spaced from the center of said disc a distance corresponding to the spacing of one of said pair of photodetectors, said opening being centered at an angular position corresponding to said reference position and having a width corresponding to about a few steps of rotation of said first stepping motor, said disc having a second opening radially spaced from the center of said disc a distance corresponding to the other of said pair of photodetectors, one end of said second opening being disposed at said angular position corresponding to said reference position, said second opening extending therefrom 180° around said disc, and means for providing beams of light extending axially across said shaft in a path intersecting said disc to said photodetectors.

11. The invention as set forth in claim 10 including means for applying the outputs from said photodetectors to said pulse sequence providing means.

12. The invention as set forth in claim 10 wherein said cutting means comprises a film cutter, solenoid for operating said cutter when energized, triggerable switch means, a capacitor connected in series with said switch means and said solenoid for providing current for operating said solenoid upon discharge thereof when said switch means closes, a source of direct current connected across said capacitor for charging said capacitor, said source including a rectifier, means for including a relay for applying A.C. voltage across said rectifier when said relay is closed, and means responsive to the voltage across said capacitor for operating said relay to open for a certain period of time after said voltage across said capacitor drops to a certain level whereby to allow for complete discharge of said capacitor and obtain zero current through said triggerable switch means.

13. The invention as set forth in claim 12 wherein said voltage responsive means includes voltage divider connected across said capacitor, a solid state timing circuit connected to said divider, and circuit means for operating said relay connected to said timing circuit.

* * * * *

UNITED STATES PATENT OFFICE
CERTIFICATE OF CORRECTION

Patent No. 4,006,395            Dated February 1, 1977

Inventor(s) Jorgen Reesen

It is certified that error appears in the above-identified patent and that said Letters Patent are hereby corrected as shown below:

Column 13, line 33, "squence" should read -- sequence --.

Signed and Sealed this

Twentieth Day of September 1977

[SEAL]

Attest:

RUTH C. MASON         LUTRELLE F. PARKER
*Attesting Officer*      *Acting Commissioner of Patents and Trademarks*